US010611911B1

(12) United States Patent
Burkhart et al.

(10) Patent No.: US 10,611,911 B1
(45) Date of Patent: Apr. 7, 2020

(54) EPOXY RESIN COMPOSITION WITH SODA LIME GLASS FILLER

(71) Applicant: SolEpoxy, Inc., Olean, NY (US)

(72) Inventors: Donald Arthur Burkhart, Escondido, CA (US); Robert Joseph Groele, Allegany, NY (US)

(73) Assignee: SolEpoxy, Inc., Olean, NY (US)

( * ) Notice: Subject to any disclaimer, the term of this patent is extended or adjusted under 35 U.S.C. 154(b) by 206 days.

(21) Appl. No.: 15/588,340

(22) Filed: May 5, 2017

Related U.S. Application Data

(60) Provisional application No. 62/332,259, filed on May 5, 2016.

(51) Int. Cl.
| | |
|---|---|
| *C08L 63/06* | (2006.01) |
| *C08G 59/32* | (2006.01) |
| *C03C 3/087* | (2006.01) |
| *C08K 5/053* | (2006.01) |
| *C01D 1/02* | (2006.01) |
| *C08L 63/00* | (2006.01) |
| *C01F 11/02* | (2006.01) |
| *C01B 33/113* | (2006.01) |

(52) U.S. Cl.
CPC ............. *C08L 63/06* (2013.01); *C01D 1/02* (2013.01); *C03C 3/087* (2013.01); *C08G 59/3245* (2013.01); *C08K 5/053* (2013.01); *C08L 63/00* (2013.01); *C01B 33/113* (2013.01); *C01F 11/02* (2013.01)

(58) Field of Classification Search
CPC ........ C08L 63/00–10; C09D 163/00–10; C09J 163/00–10; C08K 3/40; C01D 1/02; C03C 3/087; C08G 59/3245; C08J 2363/00–10
See application file for complete search history.

(56) References Cited

U.S. PATENT DOCUMENTS

| | | | |
|---|---|---|---|
| 3,849,383 A | | 11/1974 | Fetscher et al. |
| 3,942,965 A | * | 3/1976 | Osagawa ............... C03B 37/15 65/410 |
| 6,246,123 B1 | | 6/2001 | Landers, Jr. et al. |
| 6,841,888 B2 | | 1/2005 | Yan et al. |
| 6,989,412 B2 | | 1/2006 | Starkey |
| 7,119,140 B2 | | 10/2006 | Basham et al. |
| 7,125,917 B2 | | 10/2006 | Starkey |
| 7,304,102 B2 | | 12/2007 | Yan et al. |
| 7,307,286 B2 | | 12/2007 | Ito et al. |
| 7,311,972 B2 | | 12/2007 | Yan et al. |
| 7,381,359 B2 | | 6/2008 | Yan et al. |

(Continued)

FOREIGN PATENT DOCUMENTS

| | | |
|---|---|---|
| JP | 03-296519 | 12/1991 |
| JP | 07-041544 | 10/1995 |
| JP | 2000026744 A | 1/2000 |

OTHER PUBLICATIONS

Scifinder properties of CAS 2451-62-9 (2019).*
Scifinder properties of CAS 85-42-7 (2019).*

*Primary Examiner* — Kregg T Brooks
(74) *Attorney, Agent, or Firm* — Heslin Rothenberg Farley & Mesiti, P.C.

(57) ABSTRACT

Disclosed are compositions relating to optically clear epoxy resin formulations with filler compositions having superior regular transmission of light between 350 nm and 2500 nm, and a low coefficient of thermal expansion, along with optoelectronic devices sealed with the same.

22 Claims, 9 Drawing Sheets

Previous benchmark, 50% filled w/ aluminosilicate glass index =~1.54 CTE=40, RTRAN @ 550nm = 7%

New benchmark, 70% filled w/ soda lime glass index =~1.515 CTE=29, RTRAN @ 550nm = 83%

Insufficient Clarity for Image Sensors

Sufficient Clarity for Image Sensors

(56) References Cited

U.S. PATENT DOCUMENTS

| | | |
|---|---|---|
| 7,470,974 B2 | 12/2008 | Bhandarkar et al. |
| 7,622,516 B1 | 11/2009 | Starkey |
| 8,017,670 B2 | 9/2011 | Ito et al. |
| 8,466,483 B2 | 6/2013 | Ohnishi et al. |
| 8,624,343 B2 | 1/2014 | Fuke et al. |
| 8,809,125 B2 | 8/2014 | Aizpuru et al. |
| 8,969,457 B2 | 3/2015 | Briers |
| 9,548,252 B2 | 1/2017 | Lau et al. |
| 2002/0169062 A1* | 11/2002 | Pecoraro .................. C03C 1/00 501/11 |
| 2004/0248337 A1 | 12/2004 | Yan et al. |
| 2005/0101699 A1 | 5/2005 | Yan et al. |
| 2006/0083851 A1 | 4/2006 | Yan et al. |
| 2006/0084727 A1 | 4/2006 | Yan et al. |
| 2006/0147718 A1 | 7/2006 | Starkey |
| 2006/0204760 A1 | 9/2006 | Ito |
| 2007/0196657 A1 | 8/2007 | Bhandarkar |
| 2008/0012032 A1 | 1/2008 | Bhandarkar et al. |
| 2010/0143833 A1* | 6/2010 | Baba ........................ G03G 9/10 430/106.2 |
| 2014/0203468 A1 | 7/2014 | Humphries et al. |

* cited by examiner

EPOXY RESIN COMPOSITION WITH SODA LIME GLASS FILLER

CROSS REFERENCE TO RELATED APPLICATIONS

This application claims priority to U.S. provisional application No. 62/332,259, filed on May 5, 2016, the entire contents of which are hereby incorporated herein by reference.

FIELD OF THE INVENTION

The present disclosure relates to curable, optically clear, colored and translucent epoxy resin compositions comprising a soda lime glass filler with a refractive index within 1% of the refractive index of an epoxy matrix composition yielding a high regular transmission and a low coefficient of thermal expansion, a cured product comprising the same, and an optoelectronic device comprising the same.

BACKGROUND OF THE INVENTION

High-performance, transparent cured products comprising curable epoxy compositions are used in a wide variety of fields, including electric and electronic applications, optical applications, aerospace and automotive applications, and various other fields. More specific uses for the curable epoxy compositions include use as sealing materials, laminating adhesives or plates, coating compositions, encapsulants and/or adhesives for electric and electronic materials, fiber optic and optical semiconductor components, sensors and various other applications.

By way of example only, transparent epoxy resin compositions have uses in optical microelectronics, such as sensors and light emitters. These include the families of light-emitting diodes (LEDs), light and image sensors, and opto-couplers used to isolate microelectronic circuits from voltage spikes. These optoelectronic devices have been miniaturized and optimized for mass production through complex supply chains for the manufacture of many end-use applications. The industry has adopted the Joint Electronic Device Engineering Council (JEDEC) Solid State Technology Association's standardization pertaining to Moisture Sensitivity Levels (MSL) to ensure that electronic components are suitable for use in sophisticated manufacturing networks, typically requiring a minimum MSL level 3 or 4. Many, if not most, semiconductor devices require the highest level of robustness, i.e., MSL 1.

MSL is an indication whether a device may be stored in a hot and humid environment, assembled into a circuit board and then flash heated at 260 degrees)(° C. for soldering without causing the device to crack or apply damaging stress to its encapsulated electronic elements. Neat epoxy resins perform poorly with respect to MSL because epoxy will absorb moisture and they have a coefficient of thermal expansion (CTE) that is typically much higher than those of the encapsulated electronic devices. By way of example, the CTE for a typical epoxy is 80 parts per million/degree Celsius (ppm/° C.), whereas the CTE for copper is about 16.7 ppm/° C. and that for silicon is about 2.6 ppm/° C.

It is well known in the art to modify epoxy resins intended for electrical encapsulation with inorganic fillers (such as silica and metal oxides) in order to reduce the CTE and moisture absorption (MSL) of the resulting composition. Manufacturers of clear epoxy for optoelectronic devices have also utilized clear inorganic fillers but heretofore, these have yielded cured encapsulants with greatly diminished regular transmission of light (RTRAN). Thus far, encapsulation materials utilizing clear fillers may appear translucent and yield good total transmission of light (TTRAN), but the filler causes light scattering that dramatically reduces straight line transmission (RTRAN). This could be due to poor coupling between the epoxy matrix and the filler, poor clarity of the filler itself, or because the filler and the epoxy have a mismatched index of refraction.

Many optoelectronic devices require a high level of RTRAN, or regular light transmittance, to be effective (for example, often >80%). However, due to the poor optical properties of traditional epoxy plus filler compositions, the industry has been limited to the use of neat epoxy compounds or epoxy substitutes that introduce other limitations upon design and manufacturing possibilities. Accordingly, there is a chronic and growing need for an epoxy resin encapsulant that produces high RTRAN, robust MSL (e.g. <4) and low CTE. Furthermore, although in alternate applications (i.e., for example automotive sensors) a minimum regular light transmittance (RTRAN) of 30-40% may be sufficient, these applications still require both a robust MSL (e.g. <4) and low CTE.

The present disclosure provides a curable encapsulant, namely a polymer composite encapsulant or composition, which is ideally suited for a variety of applications which require a high-performance encapsulant that can withstand high temperature cycling and, thus, avoids imparting high thermally-induced stresses on the components it is encapsulating, laminating, adhering, etc. In other words, an encapsulant composition that provides for a cured product with a low CTE and robust MSL. In certain embodiments, the cured encapsulant, once cured in its "clear" variant, has a coefficient of thermal expansion (CTE) of less than 50 parts per million/degree Celsius (ppm/° C.), when measured at temperatures between 100°–120° C., and a regular light transmission (RTRAN) greater than about 30% over light wavelengths from about 350 nm to about 2500 nm in specimens 0.5 and 1.0 mm thick. In alternate, preferred embodiments, the cured encapsulant product has a CTE equal to or less than 30 ppm/° C., when measured at temperatures between 100°–120° C., and provides RTRAN greater than 65% over light wavelengths from 350 nm into the infrared (i.e. 2500 nm) when measured in molded specimens 0.5 and 1.0 mm thick.

In one embodiment of the invention, the curable encapsulant composition of epoxy-resin comprises triglycidyl isocyanurate (TGIC), a curing agent, a ring opening agent, and inorganic filler materials, wherein the inorganic filler material is selected from the group consisting of silica glass compositions (or mixtures thereof) with an index of refraction between 1.50 and 1.52 (e.g., about 1.515). More specifically, in embodiments of the invention, the silica glass composition comprises at least one soda lime glass composition or mixtures thereof.

It is also desirable, in some embodiments, to add modifiers, such as an accelerator, an antioxidant, silane, UV stabilizers, and/or a mold release agent to the epoxy-resin composition so that the composition is well adapted for use in transfer molding, injection molding, or compression molding processes used in the microelectronics and semiconductor industry.

SUMMARY OF THE INVENTION

Briefly, the present invention satisfies the need for a high-performance, transparent epoxy resin composition with high RTRAN, low MSL and low CTE. The present invention may address one or more of the problems and deficiencies of the art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

Certain embodiments of the presently-disclosed encapsulation composition, articles or devices related to the same, and/or methods for forming the encapsulation composition, have several features, no single one of which is solely responsible for their desirable attributes. Without limiting the scope of the composition, articles, devices and methods as defined by the claims that follow, their more prominent features will now be discussed briefly. After considering this discussion, and particularly after reading the section of this specification entitled "Detailed Description of the Invention," one will understand how the features of the various embodiments disclosed herein provide a number of advantages over the current state of the art.

In one aspect of the invention, a curable epoxy-resin encapsulant composition is provided comprising an unfilled, epoxy component, wherein the unfilled, epoxy component comprises a base epoxy resin, an anhydride and, optionally, a polyol for promoting the reaction of said epoxy resin and anhydride; combined with an inorganic filler material comprising silica glass. In certain embodiments, the base epoxy resin comprises triglycidyl isocyanurate (TGIC), or reactants thereof, and the silica glass comprises soda lime glass.

In another aspect of the invention, an encapsulant composition is provided with (a) an unfilled epoxy component comprising the reaction product of at least one base epoxy resin and at least one curing agent and (b) an inorganic filler material comprising silicon oxide, sodium oxide, and calcium oxide, wherein a cured form of the unfilled epoxy component has an average index of refraction of 1.50 to 1.52, and the index of refraction of the inorganic filler material is within less than 1% of the index of refraction for the cured, unfilled epoxy component. In yet another aspect, the inorganic filler material of the composition comprises soda lime glass characterized by a first component comprising the highest weight percent content of the soda lime glass and a second component comprising the second highest weight percent content of the soda lime glass, wherein the first component is silica and the second component is soda ash.

In yet another aspect of the invention, an encapsulant material is provided that comprises a cured compound, wherein the cured compound is a reaction product of a partially-cured epoxy component having a soda lime glass filler material substantially uniformly distributed therethrough, wherein said cured compound is prepared by B-staging a partially cured mixture of said unfilled epoxy component and said soda lime glass filler material. The invention is further characterized in that the unfilled epoxy component of the cured product comprises at least one base epoxy resin, at least one curing agent, and at least one polyol; the soda lime glass filler material comprises 50% to 70% of the cured compound based on the total weight of the cured compound; the cured form of the epoxy component has an average index of refraction (as defined herein) of about 1.50 to about 1.52, and the index of refraction of the soda lime glass is about 1.50 to about 1.52; and the cured compound comprises a coefficient of thermal expansion (CTE) equal to or less than 45 ppm/° C., as measured between a temperature range between 100-120° C., an average index of refraction of about 1.51 and a regular transmission of light (RTRAN) greater than 65% over light wavelengths from 350 nm to 2500 nm when measured in a 1.0 mm thick sample of said cured compound.

In still other aspects of the invention, embodiments of the cured compound have a CTE equal to or less than 30 ppm/° C., an average index of refraction of about 1.50 to 1.52, and a regular transmission of light greater than about 65% over light wavelengths from about 350 nm to about 2500 nm in specimens 0.5 and/or 1.0 mm thick. And, in still other aspects, the cured compound has a CTE of less than 60 ppm/° C. and an RTRAN greater than about 30% over light wavelengths from about 350 nm to about 2500 nm in specimens 0.5 and/or 1.0 mm thick.

In a further aspect, the invention provides an article, device or assembly comprising the inventive encapsulant composition. In yet another aspect, the invention provides a method for making a high-performance encapsulant comprising the steps of (1) preparing an unfilled epoxy resin component, which when cured, has an average index of refraction of about 1.50-1.52; (2) mixing in an inorganic glass filler with an index of refraction within <1% of the index of refraction of the unfilled epoxy resin component to form a filled, curable encapsulant composition; (3) encapsulating a device with the filled, curable encapsulant composition; and (4) curing the filled encapsulant composition.

The foregoing is illustrative only and is not intended to be in any way limiting. In addition to the illustrative aspects, embodiments, and features described above, further aspects, embodiments, and features will become apparent from the following detailed description of the various aspects of the invention taken in conjunction with the appended claims and the accompanying drawings.

BRIEF DESCRIPTION OF THE FIGURES

The present invention will hereinafter be described in conjunction with the following drawing figures, wherein like numerals denote like elements, and.

DEFINITIONS

Figure 1:
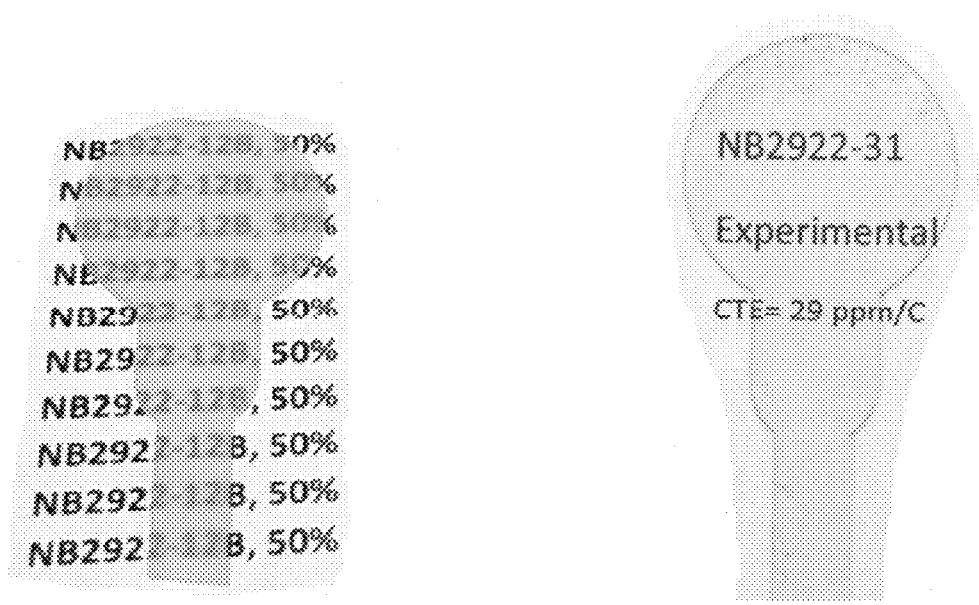
FIG. 1 is a photographic comparison of an aluminosilicate epoxy composition with an index of refraction equal to 1.54 compared to the soda glass epoxy composition of the present disclosure with an average index of refraction equal to 1.515.

As used herein, the expression "soda lime glass" refers to a glass composition comprising, without limitation, silicon oxide ($SiO_2$ or silica), sodium oxide ($Na_2O$, soda or soda ash) and calcium oxide (CaO, lime, quicklime or burnt lime), and that either is substantially-free of boron, or if present, the weight percent of the boron-containing component is less than the weight percent of the soda, as measured in weight percent total weight of the glass composition. It is sometimes also referred to as soda-lime-silica glass or alkali glass.

As used herein, the expression "cured" composition or product refers to a product that results from fully curing a curable composition. Additionally, as used herein, the expression "fully curing" refers to curing the curable composition to a degree of cure such that subsequent exposure of the resultant cured product to temperatures at or above the original cure temperature, with the exception of temperatures high enough to melt or decompose the cured product, will not materially alter the physical properties of the cured product beyond those achieved by the original curing process.

As used herein, the expression "transparent" means having an RTRAN of 80% or more, and "substantially transparent" means having an RTRAN of 70% or more.

DETAILED DESCRIPTION OF THE TECHNOLOGY

Aspects of the present invention and certain features, advantages, and details thereof, are explained more fully below with reference to the non-limiting embodiments illustrated in the accompanying drawings. Descriptions of well-known materials, fabrication tools, processing techniques, etc., are omitted so as to not unnecessarily obscure the invention in detail. It should be understood, however, that the detailed description and the specific example(s), while indicating embodiments of the invention, are given by way of illustration only, and are not by way of limitation. Various substitutions, modifications, additions and/or arrangements within the spirit and/or scope of the underlying inventive concepts will be apparent to those skilled in the art from this disclosure.

Those skilled in the art recognize that composite materials made of epoxy and glass are well known in the art. Previous attempts to develop an optically clear epoxy with low CTE and low moisture absorption included the addition of inorganic fillers, including silica and processed glass. Some of these efforts have involved the use of nanoparticles and others have sought to utilize epoxy and a filler with a large difference in refractive index in order to produce a high reflectance. See, e.g., U.S. Pat. No. 9,029,894.

In spite of these previous attempts, optoelectronic device manufacturers continue to search for clear encapsulants with low CTE and high RTRAN, and which also possess improved durability inasmuch as they are capable of sustaining the high temperatures required for surface mount application and lead-free soldering where at a minimum MSL level 3 would be required, MSL 1 being the most desirable.

In one aspect of the invention, the present technology discloses compounds comprising an epoxy resin component and a clear (or substantially clear) glass filler, wherein the refractive index of the unfilled epoxy resin component (when cured) is closely matched (i.e., within about 1%) with the refractive index of the glass filler to generate a curable, substantially transparent or transparent encapsulant composition. The resulting curable, epoxy-containing encapsulant composition is suitable for electronic, optical, and/or various other applications relating to, but not limited to, devices and uses thereof by manufacturers searching for transparent or substantially transparent encapsulation materials capable of sustaining high temperatures and temperature cycling, and that will not impart thermal stresses on the various components of the device. In additional aspects of the invention, the curable, epoxy-containing encapsulant composition is suitable for applications where the degree of transparency is not as critical (i.e. automotive applications) as the materials capability of sustaining high temperatures and temperature cycling, and ability to applying damaging stress to its encapsulated electronic elements.

In embodiments of the invention, the filled, epoxy composition is a substantially transparent epoxy composition, which when cured, is capable of transmitting light for an LED, sensor, lens, waveguide, light pipe, transmitter, receiver, and various other optical devices, as is known in the art. The curable encapsulant composition may take various forms, including but not limited to, liquid, solid, coating, encapsulant, underfill, or die attach adhesive.

In embodiments of the invention, the unfilled, epoxy-containing component (i.e. wherein "unfilled" is defined as without the inorganic glass filler), when cured, has an average index of refraction (when measured across the wavelength range of 350 nm-2500) of about 1.50-1.52, including all values, ranges and subranges therein. For example, but not meant to be limiting, the unfilled, epoxy-containing component, when cured, has an average index of refraction equal to 1.500, 1.501, 1.502, 1.503, 1.504, 1.505, 1.506, 1.507, 1.508, 1.509, 1.510, 1.511, 1.512, 1.513, 1.514, 1.515, 1.516, 1.517, 1.518, 1.519, 1.520, including all values, ranges and subranges therein.

In embodiments of the invention, while the average refractive index ($n_{avg}$) has an average value as disclosed above when measured across the wavelength range of 350 nm-2500 nm, the measured index of refraction at any particular wavelength will range between 1.50-1.53, including all values, ranges and subranges therein (e.g. 1.500, 1.501, 1.502, 1.503, 1.504, 1.505, 1.506, 1.507, 1.508, 1.509, 1.510, 1.511, 1.512, 1.513, 1.514, 1.515, 1.516, 1.517, 1.518, 1.519, 1.520, 1.521, 1.522, 1.523, 1.524, 1.525, 1.526, 1.57, 1.528, 1.529, 1.53, including all values, ranges and subranges therein). For example, in certain embodiments disclosed herein, the unfilled, cured epoxy-containing component has indices of refraction that measure between about 1.50-1.52 over wavelengths of about 535 nm-2500 nm; 1.51-1.515 over wavelengths of about 637 nm-955 nm; 1.5 to 1.53 over wavelengths of about 423 nm-2500 nm. Furthermore, the resulting average index of refraction, as defined herein, over wavelengths of about 350 nm-2500 nm is equal to in the range of about 1.150-1.515 (i.e. 1.151, 1.152, 1.153, 1.514). For purposes of the invention, the average refractive index (i.e. or, "average index of refraction" or "$n_{avg}$") is defined as the average refractive index when measured over wavelengths from about 350 nm to about 2500 nm.

In embodiments of the invention, the unfilled, epoxy-containing component used in the encapsulant composition of the present invention is a reaction product of an anhydride of a cyclic dibasic acid and a base epoxy resin. In embodiments of the invention, any thermosetting base epoxy resin may be used as a precursor resin, preferably (although optionally) one which is capable of being B-staged. Particularly desirable are solid epoxy resins, and in particular, tri- or multi-functional epoxy resins. Non-limiting examples of base epoxy resins include solid and liquid epoxy resins derived from cycloaliphatic, aliphatic, bisphenol A or F, tetramethyl and/or biphenyl, naphthalene, and epichlorohydrin, novalacs, and the like. In certain embodiments, the base epoxy resin comprises triglycidyl isocyanurate (TGIC), or reactants thereof. In other embodiments, the base epoxy resin comprises a binary epoxy mixture of triglycidyl isocyanurate (TGIC) and a cycloaliphatic epoxy. While not meant to be limiting, in embodiments of the invention, an example of the base epoxy resin is tris(2,3-epoxy-propyl) isocyanurate, sold under the tradename TEPIC® by Nissan Chemical Industries, Ltd. The chemical structure of triglycidyl isocyanurate (TGIC) is as follows:

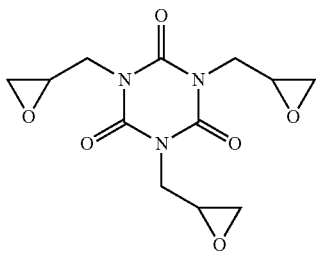

1,3,5-Triglycidyl isocyanurate, or 1,3,5,-Tris(oxiran-2-ylmethyl)-1,3,5,-triazinane-2,4,6-trione The unfilled, epoxy-containing component further comprises a curing agent (i.e. a curative or hardener), namely an anhydride, as a reactant. In preferred embodiments, the anhydride comprises a first anhydride. More specifically, the first anhydride comprises a cyclic acid anhydride as a curing agent. In embodiments of the invention, the cyclic acid anhydride is a cycloaliphatic anhydride (a/k/a/ an anhydride of a cyclic dibasic acid), such as hexahydrophthalic anhydride (HHPA). In other embodiments, although not required, the epoxy composition comprises smaller quantities of at least one second anhydride reactant, wherein the at least one second anhydride reactant is a cyclic acid anhydride selected from the group comprising tetrahydrophthalic anhydride and phthalic anhydride, or combinations thereof.

Although a second anhydride may be present as a reactant with the first anhydride, for best results, the second anhydride should be less than 50% wt % of the total anhydride content, e.g., 0 to 50 wt %, including all values, ranges and subranges therein. For example, in some embodiments, the total anhydride content comprises 50.5, 51, 55, 60, 65, 70, 75, 80, 85, 90, 95, 100 wt % of a first anhydride, or combinations or mixtures thereof, including any and all values, ranges and subranges therein; and further comprises 0, 5, 10, 15, 20, 25, 30, 35, 40, 45, 49, 49.5, 50 wt % of at least one second anhydride, or combinations or mixtures thereof, including any and all values, ranges and subranges therein. For purposes of this disclosure, the total anhydride content equals the first anhydride plus the at least one second anhydride (to the extent there is any present).

Additional examples of curing agents in accordance with the invention include phthalic anhydride, maleic anhydride, methylnadic anhydride, nadic anhydride, trimellitic anhydride, phenolic novolac resin hardeners, methylhexahydrophthalic anhydride, tetrahydrophthalic anhydride, methyl tetrahydrophthalic anhydride, succinic anhydride, nonenyl succinic anhydride, glutaric anhydride, polyazelaic polyanhydride, polysebacic polyanhydride, pyromellitic anhydride, pyromellitic dianhydride, 3,3',4,4'-Benzophenonetetracarboxylic dianhydride, etrachlorophthalic anhydride, dodecenyl succinic anhydride, 1,2,4,5-Benzenetetracarboxylic anhydride, and the like, either alone, or mixtures or blends of two or more.

Optionally, in order to promote reaction of the anhydride hardener and the base epoxy resin by opening the anhydride ring, a ring opening agent can be used. In embodiments of the invention, various ring opening agents known in the art can be incorporated into the epoxy component to assist in this ring opening reaction. Such ring opening can be accomplished, for example, by active hydrogens present as water, or by hydroxyls, or by a Lewis base.

By way of example, in embodiments of the invention, the unfilled epoxy component comprises a first polyol, to assist in the ring opening of the anhydride and promote curing of the epoxy composition. In certain embodiments, the first polyol is a lower aliphatic polyol of 3 to 8 carbon atoms and 2 to 4 hydroxyls, preferably of 3 hydroxyls. For example, and in accordance with the invention, the first polyol is selected from the group comprising glycerol, neopentyl glycol (NPG) and trimethylol propane (TMP), either alone or in mixture. In other embodiments, although not required, the polyol comprises smaller proportions of at least one second polyol blended in with the first polyol, provided that the second polyol(s) do not adversely affect the encapsulant properties. Although a second polyol may be present with the first polyol, for best results, the second polyol should not be more than 50% wt % of the total polyol content, e.g., 0 to 50% wt %, including all values, ranges and subranges therein. For example, in some embodiments, the total polyol content comprises 50.5, 51, 55, 60, 65, 70, 75, 80, 85, 90, 95, 100 wt % of a first polyol, including any and all values, ranges and subranges therein; and further comprises 0, 5, 10, 15, 20, 25, 30, 35, 40, 45, 49, 49.5, 50 wt % of at least one second polyol, or combinations or mixtures thereof, including any and all values, ranges and subranges therein. For purposes of this disclosure, the total polyol content comprises the first polyol plus the at least one second polyol (to the extent there is any present).

In embodiments of the invention, the at least one second polyol(s) is selected from the group comprising ethylene glycol, diethylene glycol, propylene glycol, dipropylene glycol and neopentyl glycol. A suitable substitute material for these or for part of them is propoxylated pentaerythritol, a tetrol having a molecular weight of about 400, sold under the name PeP-450. If present, this propoxylated pentaerythritol may be used in small quantities, generally being limited to 5% to 25% wt % of the total polyol content, preferably on a hydroxyl content basis, including all values, ranges and subranges therein (e.g. 5, 6, 7, 8, 9, 10, 11, 12, 13, 14, 15, 16, 17, 18, 19, 20, 21, 22, 23, 24, 25% wt %). In the selection of the at least one second polyol, it will often be most desirable to employ those which are liquid at room temperature or with heating to comparatively low temperatures. However, in still other embodiments, comparatively high melting materials, e.g., pentaerythritol, may be employed, preferably as a small proportion of polyol component. Additional examples of the at least one polyol further comprise cyclohexane dimethanol and polyethylene glycol.

Although the reactions to make the curable encapsulant composition, and subsequently to cure the same, may be effected without a catalyst (or accelerator), in certain embodiments, the presence of a catalyst in the unfilled epoxy component of the curable encapsulant composition may be useful to speed up the reaction (in particular when an anhydride is used as the hardener). As such, in embodiments of the invention, the epoxy component comprises a catalyst, wherein the catalyst component comprises a relatively small group of catalytic materials, namely tin soaps of fatty acids of 8 to 18 carbon atoms. These catalytic materials exert a catalytic effort without impairing the clarity, colorless nature, and other desirable properties of the encapsulant and the finished cured product. In other embodiments, alternate catalysts may be used, selected from the group comprising triethylenediamine, triphenylphosphite (TPP), imidazole derivatives (2-ethyl-4-methylimidazole and 2-methylimidazole), 1,8-Diazabicyclo[5.4.0]undec-7-ene (i.e. "DBU"), tertiary amines, quaternary ammonium salts, bases and acids, and mixtures or blends thereof.

Other than the base epoxy resin, the anhydride, and optionally the polyol for ring opening and/or a catalyst, the presence of large proportions of other materials or modifiers in the epoxy component is avoided, so as to assure maintenance of the clarity and other properties of the resulting cured polymer product. In certain embodiments, however, small proportions of additional adjuvants (i.e. modifiers) which have specific desirable effects are acceptable. For example, in embodiments of the invention, the epoxy component may comprise at least one modifier, wherein the at least one modifier is a mold release agent, wherein the mold release agent is selected from the group comprising higher fatty acids of 12 to 20 carbon atoms, or lower alcohol (1 to 3 carbon atoms) esters thereof, preferably saturated, or mixtures thereof. By way of example only, in preferred embodiments, stearic acid, myristic acid, palmitic acid or methyl stearate are utilized because they are very effective in easily releasing the cured product from the mold.

In other embodiments, the at least one modifier comprises an antioxidant. For example, while not meant to be limiting, in embodiments of the invention, an example of a suitable antioxidant is tris(2,3-epoxy-propyl) isocyanurate, sold under the tradename Irganox 1035. In still other embodiments, the at least one modifier comprises one or more UV stabilizers.

In a preferred embodiment in accordance with the invention, the proportions of the various components of the unfilled epoxy component are such as to produce the monoester of the acid anhydride and have the glycidyl moiety of the triglycidyl isocyanurate react with the acid group resulting from the anhydride-polyol reaction. Of course, in the present reactions, it is possible that a molecule of polyol may react with both carboxyls which may be considered to have come from the anhydride, or polyol hydroxyls from different polyol molecules may each react with the carboxyls. Similarly, more than one glycidyl moiety of the triglycidyl isocyanurate may react with anhydride carboxyls and, in some cases, such reactions may be effected before the anhydride reacts with polyol. However, in most instances, the reactions may be considered to be those as initially described, with a polyol forming a monoester with an acid anhydride and a glycidyl moiety of triglycidyl isocyanurate reacting with a free carboxylic acid group generated by the previous reaction. Such reactions may be considered to be effected when the three reactants are simultaneously reacted.

In preferred embodiments of the invention, while not required, each of the reactants that make up the epoxy component will have a substantially low coloration and will be essentially pure, over 95% pure, preferably over 99% pure, and most preferably 99.9 to 100% pure. Additionally, the epoxy component of the encapsulant composition will comprise reactants that are clean and colorless (or substantially colorless), and have a low water content (i.e. water content <0.3%).

Additionally, one of ordinary skill in the art will recognize that the base epoxy resin in the epoxy component may be cured with other types of epoxy hardeners or curing agents, modifiers, or catalysts to achieve the required index-matched composition (e.g. an average index of refraction of about 1.50-1.52), without the use of an anhydride or polyol. Such non-limiting examples of curing agents include isocyanuric acid derivatives and phenolic curing agents, or mixtures thereof. Such non-limiting example of catalysts include amines, imidazoles, polyamides, metal salts such as zinc octoate, organophosphates, urea, formaldehyde, and various acids and bases and adducts thereof.

In addition to the unfilled epoxy component (which comprise the base epoxy resin, curing agent and optional ring opening agents, catalysts or other modifiers), the curable encapsulant comprises an inorganic filler to produce a filled encapsulant composition. As disclosed herein, the curable, filled encapsulant composition comprises a refractive index-matched filler material, wherein the filler material has a refractive index equal to about 1.510±0.01. More specifically, the curable encapsulant compositions of the present disclosure provide refractive index matching between the epoxy resin matrix and glass filler within 1% of a nominal refractive index of about 1.51 between light wavelengths of visible light (350 nm-700 nm) and infrared (700 nm-2500 nm). In alternative embodiments, the filled, curable encapsulant compositions of the present disclosure provide refractive index matching between the epoxy resin matrix and glass filler within 1% of a refractive index in the range of about 1.50 to about 1.53 between light wavelengths of visible light (350 nm-700 nm) and infrared (700 nm-2500 nm). By way of example only, if the glass filler has a refractive index of 1.515, the epoxy matrix will have a refractive index equal to 1.4999 to 1.531, including all ranges and subranges therein. (e.g., 1.4999, 1.50, 1.501, 1,502, 1.503, 1.504, 1.505, 1.506, 1.507, 1.508, 1.509, 1.51, 1.511, 1.512, 1.513, 1.514, 1.515, 1.516, 1.517, 1.518, 1.519, 1.52, 1.521, 1.522, 1.523, 1.524, 1.525, 1.526, 1.527, 1.528, 1.529, 1.53, 1.531). Likewise, if the epoxy matrix has an average refractive index of 1.50, the glass filler will have a refractive index equal to about 1.500±1%, including all values in between.

In embodiments of the invention, the refractive index-matched filler material comprises a silica glass, more specifically soda lime glass, wherein the glass filler of the curable composition comprises silicon oxide ($SiO_2$ or silica), sodium oxide ($Na_2O$ or soda ash), and calcium oxide (CaO or lime). In accordance with the invention, smaller amounts of various other compounds may also be present in the filler material, provided the glass filler composition has a refractive index that is <1% of the refractive index for the epoxy-containing component. For example, although not meant to be limiting, the filler material may comprise smaller amounts of the following: dolomite ($MgCO_3$), $B_2O_3$, MgO, $SO_3$, $K_2O$, $TiO_2$, $Li_2O$, ZnO, $Al_2O_3$, $Na_2B_4O_7$ and $Fe_2O_3$.

In embodiments of the invention, the soda lime glass filler is a powder comprising particles ranging from about 0.1 μm to 500 μm in characteristic diameter, including any and all values, ranges and subranges therein. For example, in certain embodiments, the particle size of the soda lime glass filler is 0.1, 0.2, 0.3, 0.4, 0.5, 1, 5, 10, 15, 20, 25, 30, 35, 50, 55, 60, 70, 80, 90, 100, 150, 200, 300, 400, or 500 μm, including any and all values, ranges and subranges therein.

In accordance with the invention, the filler material comprises 60-75% wt % silicon oxide ($SiO_2$ or silica), including any and all values, ranges and subranges therein, as measured in weight percent total weight of the filler material. For example, in some embodiments, the soda lime glass filler comprises 60, 61, 62, 63, 64, 64.3, 65, 66, 67, 68, 69, 70, 70.8, 71, 72, 73, 73.6, 74, 75 wt % of silica, as measured in weight percent total weight of the filler material, including any and all values, ranges and subranges therein (e.g., 69 to 75 wt %).

Additionally, the filler material comprises 12-18% wt % of sodium oxide ($Na_2O$ or soda), including any and all values, ranges and subranges therein, as measured in weight percent total weight of the filler material. For example, in some embodiments, the soda lime glass filler comprises 12, 12.5, 13, 13.5, 14, 14.5, 15, 15.5, 16, 16.5, 17, 17.5, 18% wt % of sodium oxide, as measured in weight percent total weight of the filler material, including any and all values, ranges and subranges therein (e.g., 12 to 14 wt %).

In embodiments of the invention, the filler material further comprises 5-12% wt % of calcium oxide (CaO or lime), including any and all values, ranges and subranges therein, as measured in weight percent total weight of the filler material. For example, in some embodiments, the soda lime glass filler comprises 5, 5.2, 5.5, 6, 6.5, 7, 7.5, 8, 8.5, 9, 9.5, 10, 10.5, 11, 11.5, 12 wt % of calcium oxide, as measured in weight percent total weight of the filler material, including any and all values, ranges and subranges therein (e.g., 7 to 10.5 wt %).

In accordance with the invention, any of the above ratios are contemplated to be within the scope of this disclosure, provided that the inorganic filler component with the highest percent content by weight is silica, and the inorganic filler component with the second highest percent content by weight is the soda ash. For example, in embodiments of the invention, the percent content soda ash by weight is less than the percent content silica by weight, but greater than the percent content of calcium oxide by weight. In other words, the $Na_2O$ component has a weight percent content measured in weight percent total weight of the filler material which gives it the second highest percentage of content in the inorganic filler as compared to the other components present in the filler material (e.g. CaO, $B_2O_3$, $Al_2O_3$, $Na_2B_4O_7$). That is:

$SiO_2$ wt %<$Na_2O$ wt %<CaO wt %

In alternate embodiments, while not required, the filler material further comprises 0-2% wt % of aluminum oxide ($Al_2O_3$), including any and all values, ranges and subranges therein, as measured in weight percent total weight of the filler material. For example, in some embodiments, the soda lime glass filler comprises 0, 0.1, 0.15, 0.2, 0.25, 0.3, 0.4, 0.5, 1, 1.3, 1.5, 1.75, 2 wt % of aluminum oxide, as measured in weight percent total weight of the filler material, including any and all values, ranges and subranges therein (e.g., 0.15 to 2 wt %).

In certain embodiments of the invention, the soda lime glass filler is substantially free of boron-containing components or, alternatively, the weight percent of any boron-containing components (e.g. boric acid, borax, etc) are less than the weight percent of the soda ash content. In alternate embodiments, the soda lime glass filler comprises less than 10% wt % of any boron-containing components (i.e. 0 wt % to <10 wt %) as measured in weight percent total weight of the filler material, preferably less than 9 wt %. For example, in some embodiments, the soda lime glass filler comprises 0, 0.2, 0.5, 1, 1.5, 2, 2.5, 3, 3.5, 4, 5, 6, 6.9, 7, 8, 9, 10 wt % of boric oxide ($B_2O_3$), as measured in weight percent total weight of the filler material, including any and all values, ranges and subranges therein (e.g., 0 to 2 wt %).

Blends or mixtures of one or more glass filler compositions are contemplated to be within the scope of this disclosure, provided the glass blends or mixtures provide the appropriate index of refraction (i.e. <1% of the index of refraction for the epoxy resin). Preferably, the glass filler content comprises a special high-purity grade, which is substantially free of impurities and inclusions which could absorb or scatter light. For example, typical window glass has a green tint from minor impurities of iron. In some embodiments, the preferred filler is essentially free of iron (<1 ppm). Despite the aforementioned, one of ordinary skill in the art will recognize that the filler composition may be modified with dyes, pigments and diffusing additives to yield customized light transmission characteristics, including diffuse transmission, provided that the appropriate index of refraction is maintained.

In accordance with the invention, the inventive curable encapsulant, when filled, comprises filler material from about 10 weight percent (wt %) to about 90 weight percent (wt %) based on the total weight of the encapsulant composition, including any and all values, ranges and subranges therein. For example, in certain embodiments, the filled encapsulant composition comprises about 50 weight percent (wt %) to about 90 weight percent (wt %), or 20 weight percent (wt %) to about 80 weight percent (wt %), of the filler material based on the total weight of the filled encapsulant composition. In still other embodiments, the encapsulant composition comprises 10, 20, 30, 40, 50, 55, 58, 60, 63, 65, 69, 69.9, 70, 71, 75, 80, 90 wt % of filler material, including any and all values, ranges and subranges therein (i.e. 20-80%, 50-90%, 50-70%), based on the total weight of the filled encapsulant composition.

In embodiments of the invention, the filled encapsulant composition comprises about 10 weight percent to about 85 weight percent of the base epoxy resin based on the total weight of the curable encapsulant composition, including any and all values, ranges and subranges therein. For example, in certain embodiments, the filled encapsulant composition comprises about 10 weight percent to about 30 weight percent of the base epoxy resin based on the total weight of the filled encapsulant composition. For example, in some embodiments, the filled encapsulant composition comprises 10, 10.5, 11, 11.5, 12, 12.5, 13, 14, 15, 16, 17, 18, 19, 20, 21, 22, 23, 24, 25, 26, 27, 28, 29, 30, 35, 40, 45, 50, 55, 60, 65, 70, 75, 80, 85 wt % of the base epoxy resin, including any and all values, ranges and subranges therein.

In embodiments of the invention, the filled encapsulant composition further comprises about 10 weight percent to about 65 weight percent of a curing agent (hardener) based on the total weight of the filled encapsulant composition, including any and all values, ranges and subranges therein. For example, in certain embodiments, the filled encapsulant composition comprises about 15 weight percent to about 30 weight percent anhydride based on the total weight of the filled encapsulant composition. In still other embodiments, the filled encapsulant composition comprises 10, 11, 12, 13, 14, 15, 15.5, 16, 17, 18, 19, 20, 21, 22, 23, 24, 25, 26, 27, 28, 29, 30, 35, 40, 45, 50, 55, 60, 65 wt % of anhydride, including any and all values, ranges and subranges therein. As used herein, the percent anhydride is calculated by using the total acid anhydride content, which comprises the total amount of the at least one first anhydride plus the total amount of the at least one second anhydride (to the extent there is any present).

In embodiments of the invention, the filled encapsulant composition further comprises about 2 weight percent to about 10 weight percent of a polyol based on the total weight of the filled encapsulant composition, including any and all values, ranges and subranges therein. For example, in certain embodiments, the filled encapsulant composition comprises about 2 weight percent to about 6 weight percent of total polyol content based on the total weight of the filled encapsulant composition. In still other embodiments, the encapsulant composition comprises 2, 2.1, 2.3, 2.5, 2.8, 2.9, 3, 3.3, 3.5, 3.8, 4, 4.3, 4.5, 4.8, 5, 5.3, 5.5, 5.6, 5.7, 6, 6.5, 7, 7.5, 8.5, 9, 9.5, 10 wt % of total polyol content, based on the total weight of the filled encapsulant composition, including any and all values, ranges and subranges therein. As used herein, total polyol content comprises the total amount of an at least one first polyol and an at least one second polyol (to the extent there is any present).

In embodiments of the invention, any of the above ranges and percentages are contemplated to be within the scope of this disclosure, provided the amount of the anhydride component and the base epoxy resin in the epoxy composition are so proportioned that the ratio of the chemical anhydride equivalents to the chemical epoxy equivalents of the epoxy composition (the A/E ratio) falls within the range between about 0.5 and about 1.22, more preferably between about 0.65 and about 1.0, and most preferably between about 0.75 and about 0.95, including all values, ranges and subranges therein; and also provided that the amount of the anhydride component and the OH from the polyol in the epoxy composition are so proportioned that the ratio of the chemical anhydride equivalents to the total OH equivalents of the epoxy composition (the A/OH ratio) falls within the range between about 0.27 and about 100, more preferably between about 1.0 and about 8, and most preferably between about 1.5 and about 0.5, including all values, ranges and subranges therein.

In alternate embodiments of the invention, the filled encapsulant composition optionally comprises about 0.5 weight percent to about 3 weight percent of a catalyst based on the total weight of the filled epoxy composition, including all values, ranges and subranges therein. For example, in embodiments of the invention, the filled encapsulant composition comprises 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3 wt % of a catalyst (accelerator or accelerant) based on the total weight of the filled epoxy composition, including any and all values, ranges and subranges therein.

In accordance with the invention, when present, the mold release agent is desirably provided in an amount of from about 0.1 weight percent to about 3 weight percent based on the total weight of the filled epoxy composition, including all values, ranges and subranges therein. For example, in embodiments of the invention, the filled encapsulant composition comprises 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3 wt % of a mold release agent based on the total weight of the filled epoxy composition, including any and all values, ranges and subranges therein.

By way of example only, in certain embodiments, the curable composition comprises an approximate ratio of about 70 wt % of the filler material and about 30 wt % of the epoxy component (i.e. base epoxy resin, curing agent, and optional ring opening agents, catalysts or modifiers), based on the total weight of the filled composition. By way of further example, in certain embodiments, the curable composition comprises an approximate ratio of about 60 wt % of the filler material and about 40 wt % of the epoxy-containing and curing components, based on the total weight of the filled composition. One of ordinary skill in the art will recognize that other examples of appropriate ratios are contemplated to be within the scope of this disclosure, provided that the desired characteristics are produced (i.e. thermal shock resistance, high RTRAN, excellent electrical properties, low shrinkage, stability and moisture resistance). By way of example, 80:20 wt % (filler:epoxy component), 70:30 wt % (filler:epoxy component), 75:25 wt % (filler:epoxy component), 65:35 wt % (filler:epoxy component), 55:45 wt % (filler:epoxy component), 50:50 wt % (filler:epoxy component), etc., including all ranges, and subranges therein.

In illustrative embodiments, a cured product comprising the curable encapsulant composition is provided. In still other embodiments, the inventive encapsulant encapsulates an optoelectronic device comprising a light emitter or a light detector or both. Furthermore, in illustrative embodiments, the clear encapsulants of the present technology are expected to reach, meet and/or achieve the Joint Electron Device Engineering Council (JEDEC) Solid State Technology Association's standardization pertaining to Moisture Sensitivity Levels (MSL) at a MSL level of 2, 2a, or 3. Specifically:

TABLE 1

Required soak times in hours

| | | | Soak requirements | | | |
|---|---|---|---|---|---|---|
| | | | | Standard | | Accelerated equivalent[1] |
| | | Floor life | | Time | | Time |
| Level | Time | Conditions | (hours) | Conditions | (hours) | Conditions |
| 2 | 1 year | ≤30° C./60% RH | 168 +5/−0 | 85° C./60% RH | | |
| 2a | 4 weeks | ≤30° C./60% RH | 696[2] +5/−0 | 30° C./60% RH | 120 +1/−0 | 60° C./60% RH |

TABLE 1-continued

Required soak times in hours

| | | | Soak requirements | | |
| --- | --- | --- | --- | --- | --- |
| | | | Standard | | Accelerated equivalent[1] |
| | Floor fife | | Time | | Time |
| Level | Time | Conditions | (hours) | Conditions | (hours) | Conditions |
| --- | --- | --- | --- | --- | --- | --- |
| 3 | 168 hours | ≤30° C./60% RH | 192[2] +5/−0 | 30° C./60% RH | 40 +1/−0 | 60° C./60% RH |

TABLE 2

| Moisture sensitivity level | 2 | 2a, 3, 4 5, & 5a |
| --- | --- | --- |
| Dry Pack Requirements | Yes | Yes |
| Floor Life Maximum Conditions & Time | ≤30° C./60% RH 1 year | ≤30° C./60% RH "Y" hours |
| Preconditioning Sequence (Step 3.1.1) dc electrical/functional 25° C. | R | R |
| (Step 3.1.2) 40× Visual Exam. | R | R |
| (Step 3.1.3) Shippability Temp Cycle 5 cy −40° C. to 60° C. | O | O |
| (Step 3.1.4) Bake 125° C. for 24 Hours | R | R |
| (Step 3.1.5) Moisture Soak 168 hours 85° C./85% RH | | |
| 168 hours 85° C./60% RH | R | |
| "z" hours 30° C./60% RH | | R |
| 6 hours 30° C./60% RH | | |
| (Step 3.1.6) Reflow Solder Temperature per Table 2, 3 cycles | R | R |
| (Step 3.1.7) Flux immersion for 10 seconds minimum | R | R |
| (Step 3.1.8) Rinse in deionized water | R | R |
| (Step 3.1.9) Dry room ambient | R | R |
| (Step 3.1.10) dc electrical/functional 25° C. | R | R |
| (4) Reliability tests | R | R |
| (4) dc electrical/function 25° C. end points | R | R |

R = Required O = Optional

In some embodiments, the inventive encapsulant composition, once cured, has a Coefficient of Thermal Expansion (CTE) below 45 parts per million/degree Celsius (ppm/° C.), preferably below 30 parts per million/degree Celsius (ppm/° C.), over a temperature range of 100°–120° C. In such embodiments, the compositions provide reduced water absorption which would directly correlate to improved JEDEC MSL classification levels. In still further embodiments contemplated herein, the inventive encapsulant has a CTE ranging from about 18 ppm/° C. to about 60 ppm/° C., over a temperature range of 100°–120° C., including all values, ranges and subranges therein. For example, in certain embodiments, the inventive encapsulant has a CTE equal to 18, 19, 20, 21, 22, 23, 24, 25, 26, 27, 28, 29, 30, 31, 35, 38, 40, 45, 50, 55, 60 ppm/° C., over a temperature range of 100°–120° C., including any and all values, ranges and subranges therein. The inventive encapsulant has a glass transition temperature (Tg) ranging from about 20° C. to 270° C., 100° C. to 210° C., and most preferably 120° C. to 180° C., including all values, ranges and subranges therein. For example, in certain embodiments, the inventive encapsulant has a Tg equal to 20, 30, 40, 50, 60, 70, 80, 90, 100, 110, 120, 125, 130, 135, 140, 145, 150, 155, 160, 165, 170, 175, 180, 190, 200, 210, 220, 230, 240, 250, 260, 270° C., including any and all values, ranges and subranges therein.

In embodiments of the invention, and not in any way meant to be limiting, the filler material in embodiments of the invention may have the following compositions, as measured in weight percent total weight of the glass filler content, and still remain within the scope of the disclosure.

TABLE 3

| | 1 | 2 | 3 | 4 | 5 | 6 | 7 |
| --- | --- | --- | --- | --- | --- | --- | --- |
| $SiO_2$ | 73% | 74% | 73% | 73% | 70% | 73.6% | 69% |
| $Na_2O$ | 14% | 12% | 14% | 12% | 15% | 16% | 13% |
| CaO | 9% | 10.5% | 7% | 6% | 9% | 5.2% | 11% |
| $Al_2O_3$ | 0.15% | 1.3% | 2% | | | | |
| $K_2O$ | 0.03% | 0.3% | | | | | |
| $SO_3$ | | 0.2% | | | | | |
| MgO | 4% | 0.2% | 2% | | | | |
| $Fe_2O_3$ | <0.1% | 0.04% | | | | | |
| $TiO_2$ | 0.02% | 0.01% | | | | | |
| $B_2O_3$ | | | | 2% | | | |
| $Na_2B_4O_7$ | | | | | 9% | | |
| Other | | | | | | 6% | 5.2% | 7% |

In addition to the examples disclosed above, one of ordinary skill in the art will recognize that alternate compositions of silica glass filler are contemplated to be within the scope of this disclosure, provided the glass filler composition provides the appropriate index of refraction (i.e. <1% of the index of refraction for the unfilled epoxy-containing component) and has soda ash as the second highest component by weight.

In embodiments of the invention, it has been discovered that forming a filled, epoxy-resin composition that comprises about 100 parts per weight of triglycidyl isocyanurate (TGIC), 100-150 parts per hundred (PPH) resin by weight of hexahydrophthalic anhydride (including any and all ranges and subranges therein), 250-1100 PPH resin by weight soda lime glass (including any and all ranges and subranges therein), and 15-25 PPH resin by weight neopentyl glycol (including any and all ranges and subranges therein) results in an encapsulant that has a CTE between about 30-45 ppm/° C. over a temperature range of 100°–120° C., a glass transition temperature (Tg) greater than 135° C., and an index of refraction of about 1.515+/−0.01. Furthermore, at filled loads of 50-70%, cured sample (0.5 or 1.0 mm) of the above formulation were found to have superior RTRAN, in the range of 67%-83%.

More specifically, one example formulation in accordance with the invention, although not meant to be limiting, is as follows:

100 parts per weight of triglycidyl isocyanurate
143 parts per hundred (PPH) resin by weight of hexahydrophthalic anhydride
0.3 parts per hundred (PPH) resin by weight of Irganox 1035

632 parts per hundred PPH resin by weight soda lime glass

5 PPH resin by weight of trimethoxy[3-(oxiranylmethoxy)propyl]-silane

23 PPH resin by weight neopentyl glycol

EXAMPLES

The invention will now be illustrated, but not limited, by reference to the specific embodiments described in the following examples.

Example 1

In this example, 0.5 mm thick samples of a 70% filled soda lime glass molded product and 0.5 mm thick samples of a 50% filled aluminosilicate glass molded product were prepared. The aluminosilicate epoxy-resin composition comprises an aluminosilicate glass filler (index of refraction of 1.54) and an epoxy matrix with an index of refraction of about 1.51. In contrast, the right-hand side of FIG. 1 demonstrates an epoxy-resin composition comprising a soda lime glass filler (index of refraction of about 1.515) and an epoxy matrix with an index of refraction of about 1.51. The 0.5 mm thick molded sample (i.e. Sample C) was prepared in accordance with the following formulation:

TABLE 4

| Material Description | Sample C (wt %) |
|---|---|
| TEPIC-S | 11.07 |
| HHPA (hardener) | 15.86 |
| Irganox 1035 | 0.03 |
| Myristic Acid | |
| Stearic Acid | |
| Soda lime glass | 70 |
| Gamma-Glycidoxypropyltrimethoxy Silane | 0.5 |
| 3-mercaptopropyltrimethoxysilane | |
| Neopentyl glycol polyol -NPG | 2.54 |

The above epoxy compositions were cured, and then samples 0.5 mm thick were prepared. FIG. 1 compares the clarity (RTRAN) of the 0.5 mm specimen of aluminosilicate glass epoxy to the clarity of the soda lime glass epoxy composition. In the images shown in FIG. 1, the text is printed on paper behind the 0.5 mm thick specimens. Referring to FIG. 1, the resulting epoxy resin composition on the left appears almost clear based on the naked eye, which would cause one to expect high RTRAN. However, this is not the case. As can be seen in FIG. 1, the aluminosilicate glass epoxy sample has insufficient clarity for image sensors (e.g. RTRAN, 550 nm=7%), while the soda lime glass epoxy sample results in sufficient clarity for image sensors (e.g. RTRAN, 550 nm=83%).

As shown here, the soda glass epoxy-resin composition with a more closely-matched index of refraction appears clear and when measured, this composite yields very high RTRAN. More specifically, the 0.5 mm thick specimen of the soda lime glass cured product yielded a CTE less than 30 ppm/° C. (i.e. 29 ppm/° C.), when measured at temperatures between 100-120° C., and a RTRAN greater than 80% (i.e. 83%) over light wavelengths from 400 nm to 1000 nm.

Example 2

In this example, 0.5 mm thick samples of a 70% filled soda lime glass molded product and 0.5 mm thick samples of a 70% filled aluminosilicate glass molded product were prepared. The composition of the soda lime glass sample is the same as that shown in Table 4 (i.e. Sample C).

Figure 2:
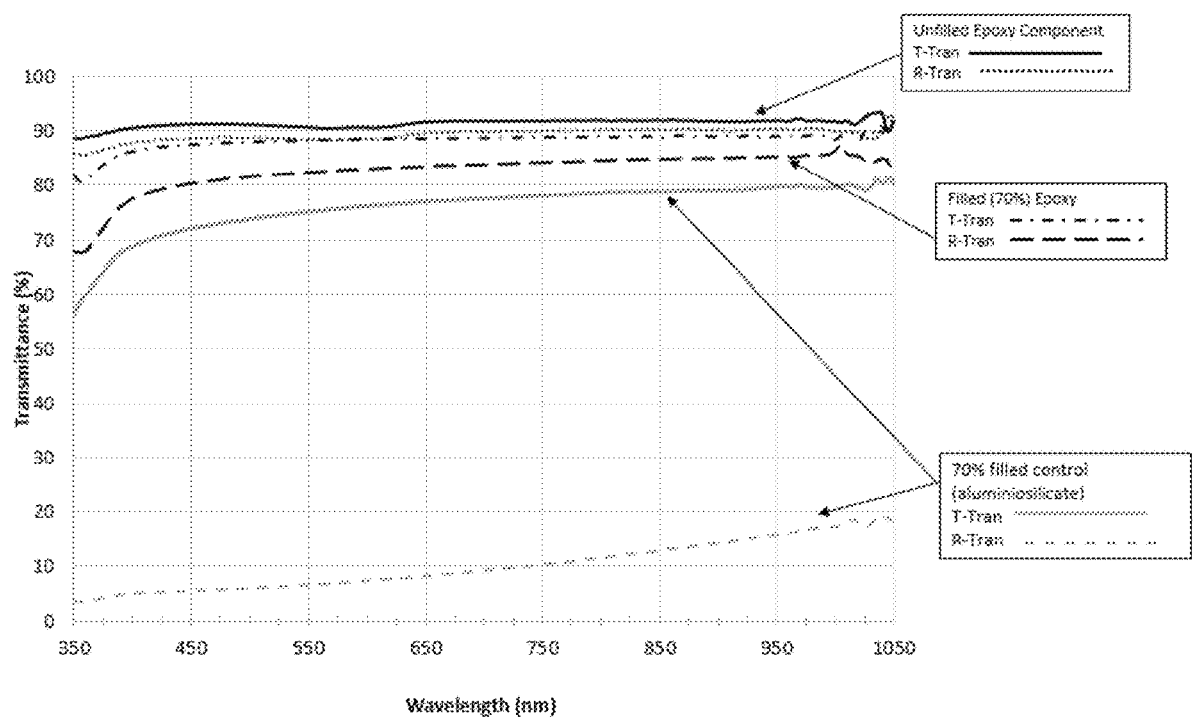
FIG. 2 is a graphical illustration showing regular straight-line transmission (RTRAN) (%) of various soda glass epoxy resin composition samples as a function of wavelength (nm) over a wavelength range from about 400 nm to about 1050 nm.

FIG. 2 shows a graph disclosing the results of experimentation using the present technology versus methods known in the art to reduce the CTE of a clear encapsulation material by adding a clear filler. FIG. 2 is a graphical representation showing regular straight-line transmission (RTRAN) (%) for Comparative Example 1 (a soda glass epoxy resin) and Example 2 (aluminosilicate glass epoxy resin) as a function of wavelength (nm) over a wavelength range from about 400 nm to about 1050 nm.

The results shown in FIG. 2 demonstrate that an encapsulate comprising an epoxy matrix with an index of refraction of about 1.51 (when measured between 650-2500 nm) and an aluminosilicate glass filler with index of refraction of 1.54 will yield good TTRAN, but poor RTRAN. In comparison, an encapsulate comprising an epoxy matrix with an index of refraction of about 1.51 and a soda lime glass filler with an index of refraction of about 1.515 will yield both a very high TTRAN and very high RTRAN. As such, a clear soda lime glass with index of refraction within 1% of the matrix epoxy yields superior RTRAN and improved TTRAN.

More specifically, and as shown in FIG. 2, the RTRAN for the soda lime glass sample shows a twelve-fold increase, from 7% to 83%, over the aluminosilicate epoxy sample when measured at a wavelength of 550 nm. In addition, it can be seen in FIG. 2 that the presence of the soda lime glass filler increases total light transmittance (TTRAN) and not just RTRAN (i.e. from 75% to 88%).

Example 3

Figure 3:
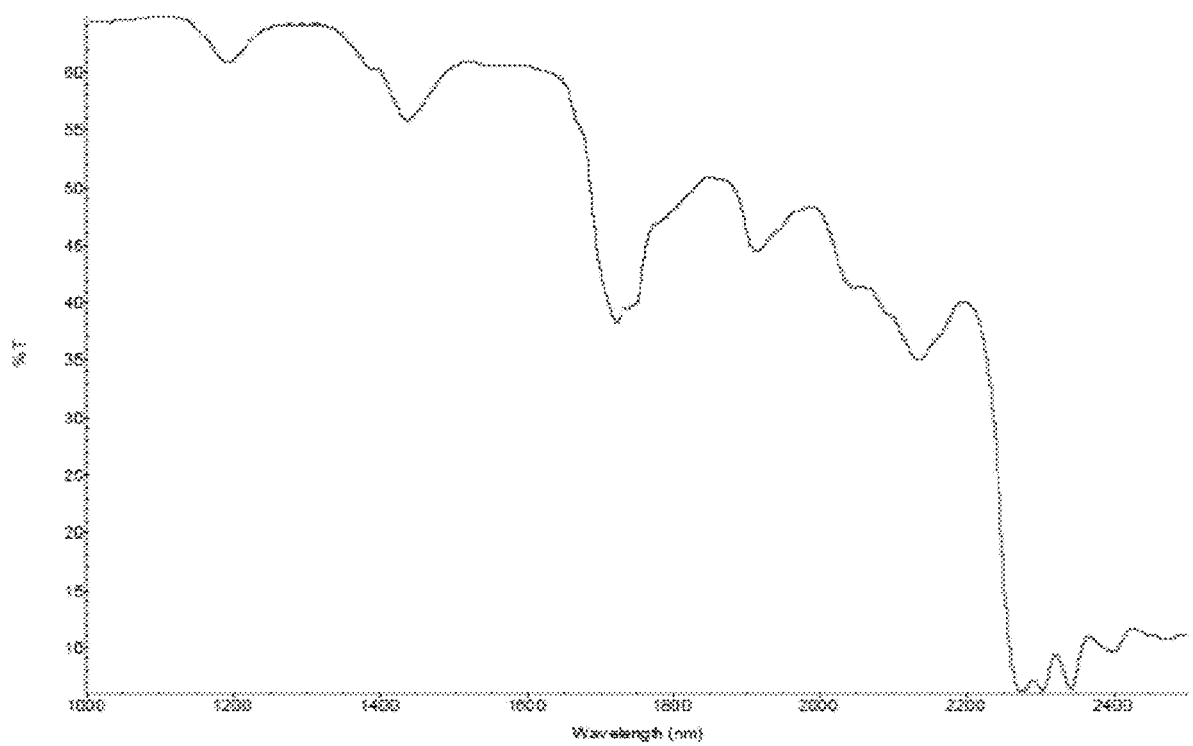
FIG. 3 is a graphical illustration showing regular straight-line transmission (RTRAN) (%) of the soda glass composition (1.0 mm thick cured sample) as a function of wavelength (nm) over a wavelength range from about 350 nm to about 2500 mm.

FIG. 3 is a graphical illustration showing regular straight-line transmission (RTRAN) (%) of an epoxy resin composition sample as a function of wavelength (nm) over a wavelength range from about 400 nm to about 2500 nm. Prior to carrying out this example, an epoxy resin of the following composition was prepared:

TABLE 5

| Material Description | kgs | Weight % |
|---|---|---|
| TEPIC-S | 3.198 | 15.98 |
| HHPA (hardener) | 4.658 | 23.29 |
| Irganox 1035 | 0.009 | 0.045 |
| Myristic Acid | 0.300 | 1.5 |
| Soda lime glass | 11.0 | 55 |
| Gamma-Glycidoxypropyltrimethoxy Silane | 0.060 | 0.3 |
| Neopentyl glycol polyol -NPG | 0.7758 | 3.879 |
| TOTAL | 20 | 100 |

Using the above obtained epoxy composition, cured products of 1 mm in thickness were prepared, and the RTRAN of the cured sample was measured over the identified range of wavelengths (nm) into the infrared spectrum using a Thermo Scientific™ Antaris™ II FT-NIR Analyzer. As shown by FIG. 3, the examples illustrate a superior RTRAN for cured samples of the encapsulant composition disclosed herein into the infrared spectrum. The sample shown in FIG. 3 has a CTE equal to 47 ppm/C° over a temperature range of 100°–120° C.

Example 4

Figure 4:
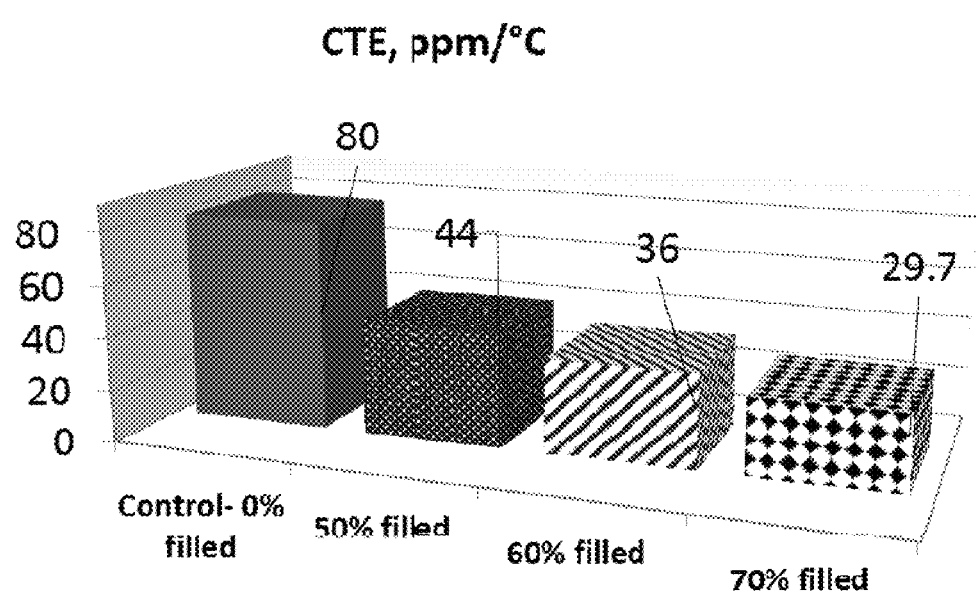
FIG. 4 is a graphical illustration showing the coefficient of thermal expansion (CTE) for the soda glass epoxy composition as a function of the glass filler weight percent based on the total weight of the soda glass epoxy composition.

FIG. 4 shows a graph showing the coefficient of thermal expansion (CTE) for representative Samples A-C (see below in Table 6) as a function of the soda lime glass filler weight percent based on the total weight of the epoxy resin composition, over a temperature range of 100°–120° C.

Example 5

FIG. 5 is a graphical illustration showing regular straight-line transmission (RTRAN) (%) of various epoxy composition samples, prepared in accordance with the disclosure herein, as a function of CTE)(ppm/C° at varying wavelengths (nm), versus comparative examples of cured products known in the art that use an inorganic filler to lower CTE.

Prior to carrying out these measurements, an epoxy composition comprising the following formulation(s) was prepared:

TABLE 6

| Material Description | Sample A (wt %) | Sample B (wt %) | Sample C (wt %) |
|---|---|---|---|
| TEPIC-S | 18.42 | 14.48 | 11.07 |
| HHPA (hardener) | 26.40 | 20.75 | 15.86 |
| Irganox 1035 | 0.05 | 0.04 | 0.03 |
| Myristic Acid | 0.5 | | |
| Stearic Acid | 1.0 | | |
| Soda lime glass | 50 | 60 | 70 |
| Gamma-Glycidoxypropyltrimethoxy Silane | 0.2 | 0.2 | 0.5 |
| 3- mercaptopropyltrimethoxysilane | 0.2 | 0.2 | |
| Neopentyl glycol polyol -NPG | 4.23 | 3.33 | 2.54 |

The above epoxy compositions were cured, and then samples 1 mm thick were prepared. The RTRAN of the cured samples was measured at the identified wavelengths (nm) and the CTE was measured over a temperature range of 100°–120° C. on the respective samples, as follows.

TABLE 7

| Material - 1 mm samples | CTE1 | RTRAN (400 nm) | RTRAN (650 nm) |
|---|---|---|---|
| Unfilled | 76 | 88.71 | 90.5 |
| 50% Filled - Sample A | 44 | 73.58 | 81.9 |
| 60% Filled - Sample B | 36 | 74.18 | 79.2 |
| 70% Filled - Sample C | 30 | 67.3 | 71.48 |

Figure 5A:
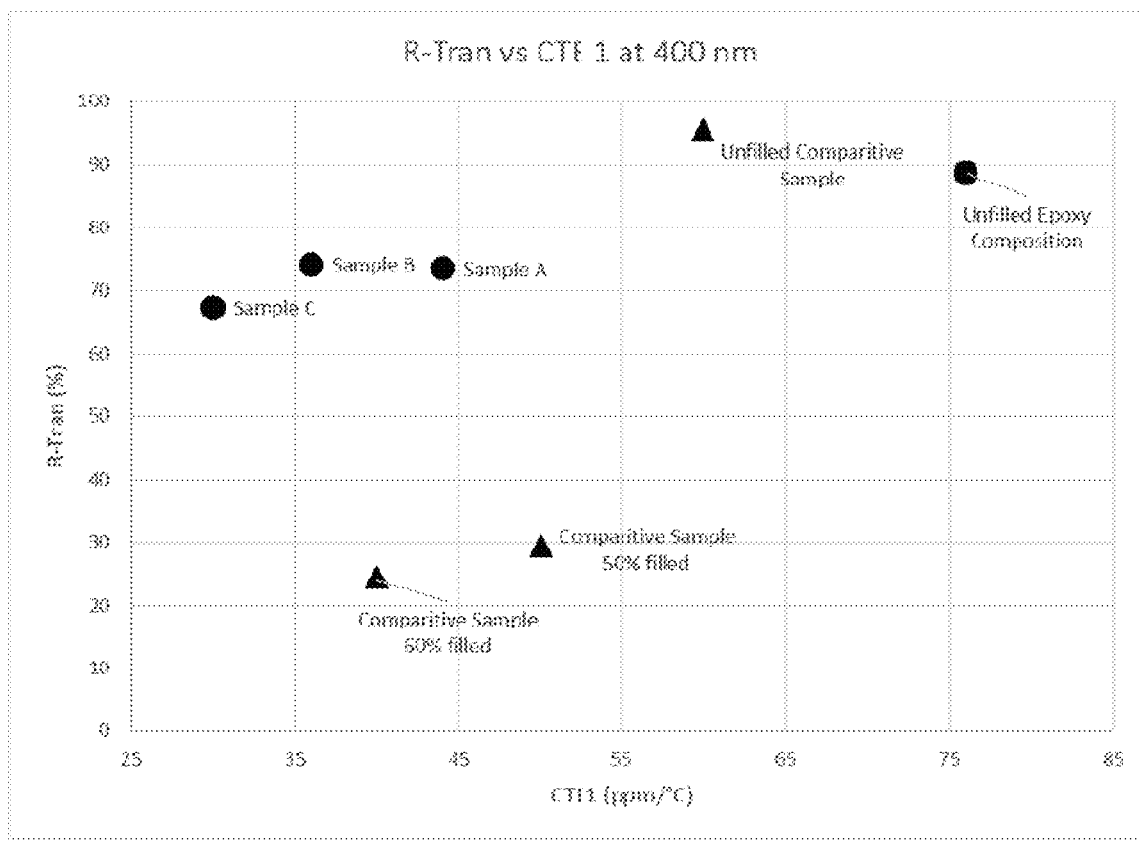
FIG. 5a-b is a graphical illustration comparing RTRAN as a function of the coefficient of thermal expansion (CTE) for epoxy resin compositions with varying glass filler weight percent (0, 50%, 60%, 70%) at 400 nm and 650 nm.
Figure 5B:
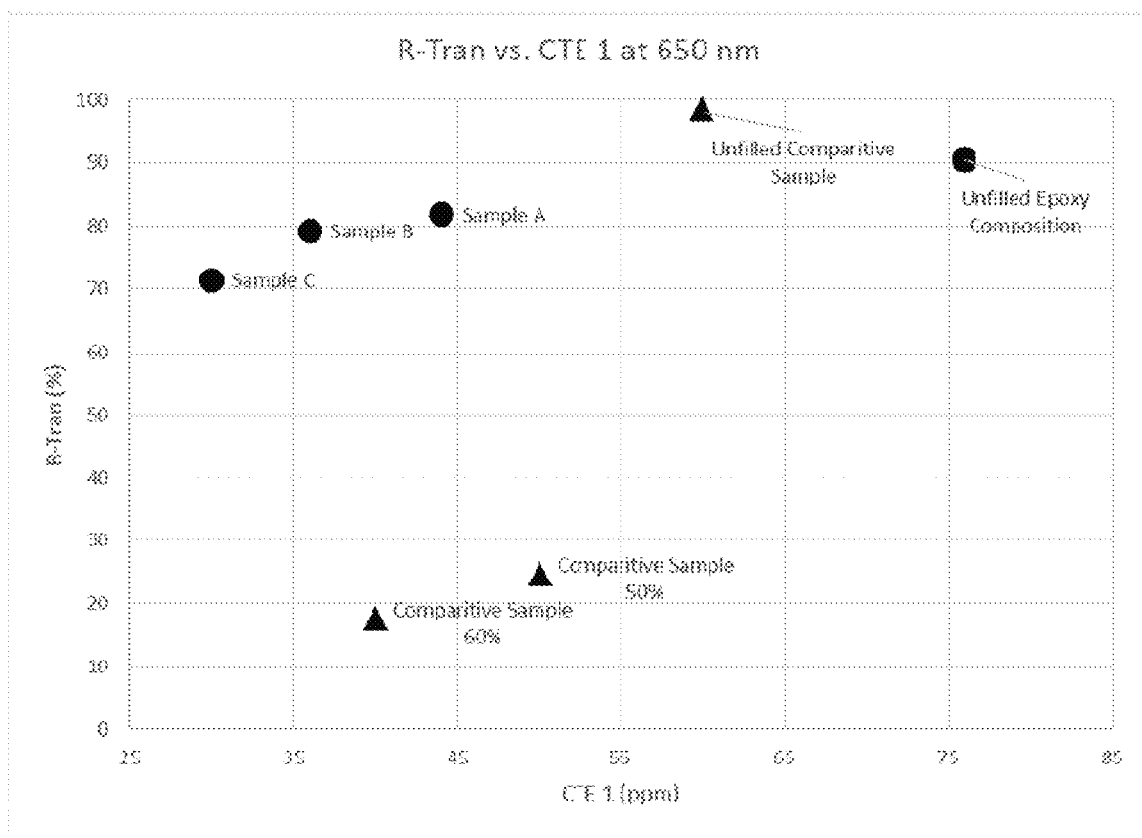

FIG. 5a-5b are graphical representations of the above measurements as compared to samples known in the art. FIG. 5a is the comparative data shown at a wavelength of 400 nm, while FIG. 5b is at a wavelength of 650 nm. As shown in FIGS. 5a-5b, the inventive encapsulant disclosed herein results in a surprisingly low drop in RTRAN between the unfilled and filled cured products (i.e. shallower slope between the data points). The surprising nature of these results is exemplified by the comparative data shown for an epoxy-based encapsulant known in the art which, in contrast, exhibits a comparatively steep drop in RTRAN between products which are filled and unfilled at similar wavelengths.

Figure 6:
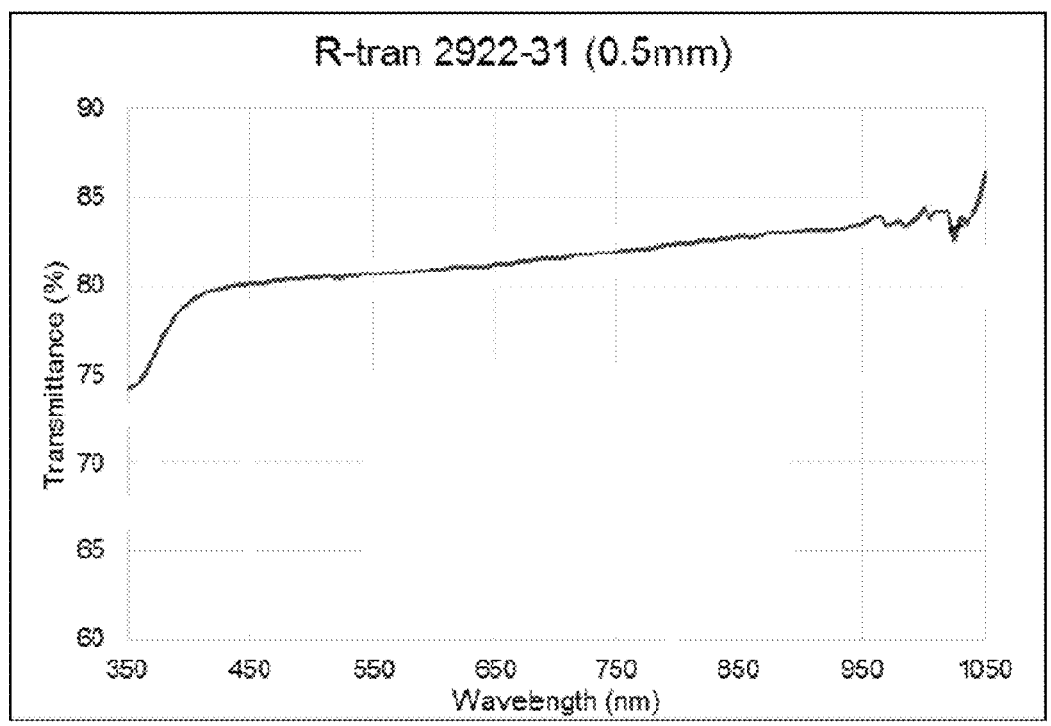
FIG. 6 is a graphical illustration showing regular straight-line transmission (RTRAN) (%) of a cured sample (0.5 mm thick) in accordance with the invention as a function of wavelength (nm) over a wavelength range from about 350 nm to about 1050 nm.

Using the same formulation for Sample C as shown in Table 6, a 0.5 mm sample of the cured product was prepared. FIG. 6 is a graphical illustration showing regular straight-line transmission (RTRAN) (%) of the cured sample (0.5 mm thick) as a function of wavelength (nm) over a wavelength range from about 350 nm to about 1050 nm.

Figure 7:
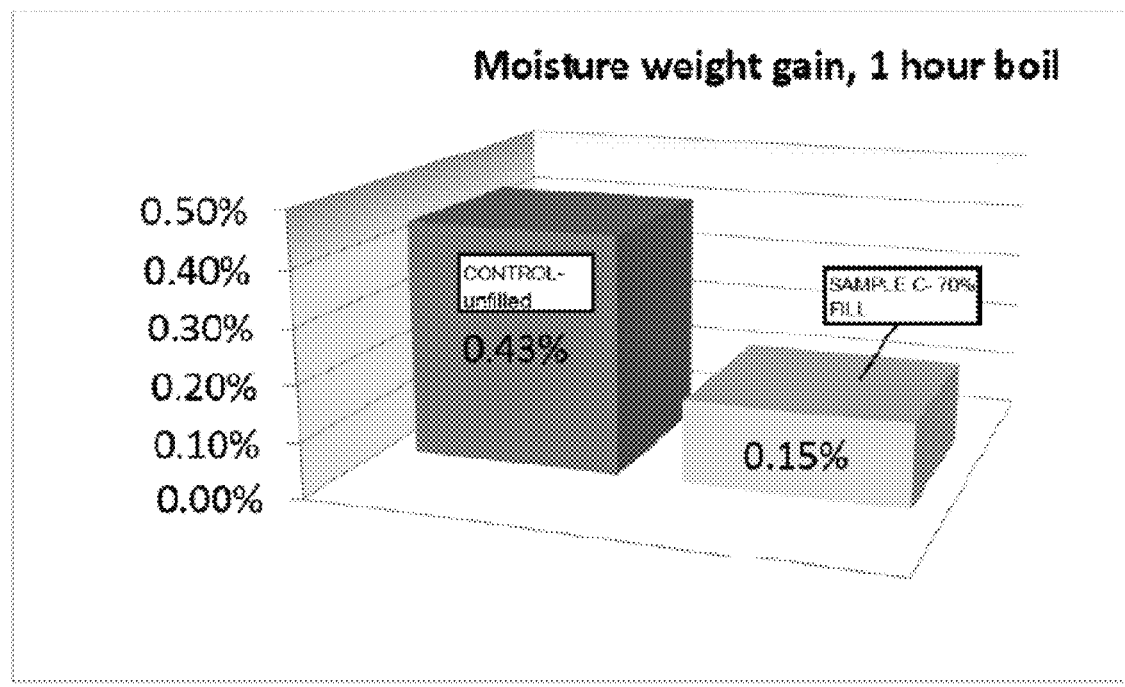
FIG. 7 shows comparative moisture absorption for an unfilled, cured epoxy composition and a 70% filled, cured product in accordance with the invention.

Using the same formulation as that for Sample C in Table 6, the moisture weight gain of a cured soda lime glass-filled (70%) sample and an unfilled cured epoxy sample were measured with a one (1) hour boil. FIG. 7 shows comparative moisture weight gain (in weight percent) data for the unfilled, cured epoxy component (i.e. control) as compared to the 70% filled, cured product (Sample C in Table 6).

Figure 8:
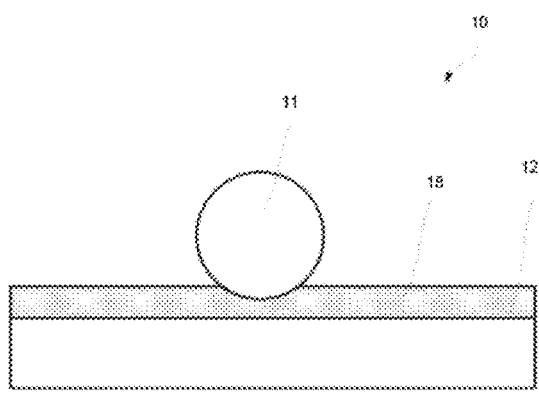
FIG. 8 shows a cross-section view of an example of a device coated with the cured product of the encapsulant composition in accordance with the invention.

FIG. 8 shows a sectional view of an example of an LED package (an optoelectronic device) comprising the encapsulant composition described herein. An encapsulant composition according to an embodiment of the present invention can be used to form a cured product that can be used as an adhesive, an encapsulant, a seal for an optoelectronic device, or a component of an electronic assembly. In the embodiment shown in FIG. 6, an electronic assembly 10 includes an optoelectronic component 11 on a substrate 12 and the cured epoxy resin product of the encapsulant composition 18 between the substrate and the optoelectronic component 11. The substrate 12 and optoelectronic component 11 may include any suitable materials used in existing optoelectronic (or electronic) assembly or device. As used herein, the term "optoelectronic device" refers to an optoelectronic component, and the term "optoelectronic assembly" or "electronic assembly" refers to an optoelectronic component (or electronic device) attached to a substrate by soldering and/or with an adhesive.

In certain examples, although not limiting, the optoelectronic element is an optical semiconductor element and the optoelectronic device is an optical semiconductor device using the optoelectronic element, wherein the composition encapsulating the optical semiconductor element has a high light transmittance even within a broad temperature range together with an internal stress reducing effect. Non-limiting examples of such an article, device or assembly include, for example, light emitting diode displays and microdisplays, automotive sensors, semiconductor sensors, photovoltaic cells, liquid crystal displays (LCD), RGB (red, green, blue) LED panels/matrices, plasma displays, and microelectromechanical (MEMS) devices, lenses, waveguides, light pipes, transmitters, fiber optic components, photodetectors, and receivers.

In another aspect of the invention, a method is provided for making a high-performance encapsulant comprising the steps of (1) preparing an unfilled epoxy resin matrix, which when cured, has an average index of refraction of about 1.50-1.52; (2) uniformly mixing in a glass filler with an index of refraction within <1% of the index of refraction of the unfilled epoxy component to form a filled, curable encapsulant composition; (3) encapsulating a device with the filled, curable encapsulant composition; and (4) curing the filled encapsulant composition with time or heat. In some embodiments, the filled epoxy composition is optionally heated using a temperature in the range of 90° C. and 200° C. to cure (i.e. thermally cured). In embodiments of the invention, the duration of the curing may be between about 0.5 and 8 hours.

In alternate embodiments of the invention, while not required, the epoxy composition is capable of being "B-staged". In other words, the epoxy composition disclosed herein can be heat cured for a short period of time and then cooled to prevent complete polymerization of the resin system, thereby producing a partially cured (i.e. less than 10%) solid composition. The partially cured epoxy is subsequently heated to reactivate polymerization and complete the curing cycle. B-staged epoxies, and methods related thereto, are well-known in the art, and are described, for example, in U.S. Pat. Nos. 3,849,383, 6,989,412 and 7,125,917.

In certain embodiments, the inventive encapsulant composition is modified by the addition of at least one silane coupling agent to produce a silane-modified epoxy resin composition. The silane-modified epoxy resin increases the stability (heat and/or flame resistance) of the inventive encapsulant. Silanation techniques are well known in the art. In certain embodiments, prior to introducing the glass filler material into the epoxy resin matrix, the filler material is pretreated with a solution having silane to produce silane-treated glass filler. The concentration of the silane in the solution may be between about 1 wt % and 3 wt %, and the weight ration of the silane to the glass filler material is between about 0.05 wt % and 2 wt %. In other embodiments, the silane coupling agents can be mixed with the unfilled, epoxy resin matrix before the filler is added. In certain embodiments, the at least one silane coupling agents may be selected from at least one member the following group: trimethoxy[3-(oxiranylmethoxy)propyl]-silane, amino silane, epoxy silane, mercapto silane, combinations and mixtures thereof.

Certain previous attempts theorized that refractive index matching within about 10% would be sufficient, i.e. wherein the indices of refraction for the fillers ranged between 1.50 and 1.58 (See U.S. Pat. No. 9,029,894), and further stating that materials with a higher difference in the index of refraction was desirable in order to increase reflectivity. Encapsulation materials developed according to this precept exhibit effective "total transmission" (or TTRAN as measured in an "integration sphere") due to the light being scattered but not absorbed by the transparent filler. These encapsulating materials do not, however, achieve sufficiently high "regular transmission" (RTRAN measured as straight line, non-scattered light transmission). The present inventors have discovered and demonstrated that refractive index matching within <1% is necessary to achieve very high RTRAN. Optoelectronic device manufacturers, particularly manufacturers of image sensors, ambient light sensors and infrared sensors require optically clear encapsulants with very high RTRAN.

The surprising and unexpected aspect of the present technology concerns the straight-forward nature of the solution to obtaining a clear encapsulant with high RTRAN and low CTE, which, although desired by the optoelectronic manufacturing community at large, has never before been materialized. In this regard, the present inventors have discovered that by very closely matching the refractive index of the epoxy matrix, e.g., an average refractive index of 1.50-1.52, with soda lime glass filler having nearly identical refractive index (within 1%) of the nominal refractive index of the epoxy matrix, the desired regular transmission (RTRAN) is preserved even at high concentrations of soda lime glass filler (>50%), and is suitable to reduce Coefficient of Thermal Expansion (CTE) to desirable levels (for example, <45 ppm/° C., nominally 30 ppm/° C.). One of ordinary skill in the art will recognize that unfilled epoxy typically exhibits about 80 ppm/° C., while filled epoxy composite can be as low as 17 ppm/° C. However, there is a long-felt need in the market for an epoxy-resin molding composition that comprises a combination of a low CTE, high RTRAN and low MSL.

It is surprising that these desired results were achieved using soda lime glass, which has CTE equal to $8.6 \times 10^{-6} K^{-1}$ at 20° C., which is much higher than borosilicate glass (which has a CTE of about $3.3 \times 10^{-6} K^{-1}$ at 20° C., almost ⅓ of a soda lime glass). When compared to soda lime glass, it is well known in the art that borosilicate glass provides a greater resistance to thermal changes and chemical corrosion, while soda-lime glass is not as resistant to high temperatures and sudden thermal changes. The results reported herein were surprising and unexpected, because one of ordinary skill in the art would not expect soda lime glass to impart the desired characteristics (low CTE, high RTRAN and low MSL), and as such would be unlikely to try use soda lime glass to produce a high-performance curable epoxy. It is also surprising that the addition of soda lime glass in the present invention is able to achieve these desired levels because typical molded epoxies have indices of refraction greater than about 1.54 and therefore require an inorganic filler with index of refraction that is much higher than soda lime glass (1.515).

The following patent applications are expressly incorporated herein by reference: U.S. Pat. Nos. 3,849,383, 7,125,917, and 6,989,412.

The present disclosure is not to be limited in terms of the particular embodiments described in this application. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

Where one or more ranges are referred to throughout this specification, each range is intended to be a shorthand format for presenting information, where the range is understood to encompass each discrete point within the range as if the same were fully set forth herein.

As will be understood by one skilled in the art, for any and all purposes, particularly in terms of providing a written description, all ranges disclosed herein also encompass any and all possible subranges and combinations of subranges thereof. Where one or more ranges are referred to throughout this specification, each range is intended to be a shorthand format for presenting information, where the range is understood to encompass each discrete point within the range as if the same were fully set forth herein.

As will also be understood by one skilled in the art, all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 filler materials refers to groups having 1, 2, or 3 filler materials, and so forth.

While various aspects and illustrative embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

All references or publications cited herein are incorporated by reference in their entireties and for all purposes to the same extent as if each individual publication, patent, or patent application was specifically and individually incorporated by reference in its entirety for all purposes. Subject matter incorporated by reference is not considered to be an alternative to any claim limitations, unless otherwise explicitly indicated.

What is claimed is:

1. An encapsulant material comprising a cured compound, said cured compound comprising a reaction product of a partially-cured epoxy component having a soda lime glass filler material substantially uniformly distributed therethrough, wherein said cured compound is prepared by B-staging a partially cured mixture of said epoxy component and said soda lime glass filler material; and wherein the cured compound comprises a coefficient of thermal expansion (CTE) equal to or less than 45 ppm/° C., as measured between a temperature range between 100°–120° C., and a regular transmission of light (RTRAN) in the range of 30% to 83% over light wavelengths from 350 nm to 2500 nm when measured in a 1.0 mm thick sample of said cured compound.

2. An encapsulant material in accordance with claim 1 wherein: the epoxy component comprises at least one base epoxy resin, at least one curing agent, and at least one polyol; the soda lime glass filler material comprises 50% to 70% of the cured compound based on the total weight of the cured compound and wherein the epoxy component has an average index of refraction of between 1.50 and 1.52, and the soda lime glass filler material has an average index of refraction between 1.50 and 1.52, both when measured over a wavelength range of 350 nm to 2500 nm.

3. An encapsulant material in accordance with claim 2 wherein the base epoxy resin comprises 10% to 20% of the composition based on the total weight of the composition, the at least one curing agent comprises 15% to 30% of the composition based on the total weight of the composition, and the polyol comprises 2% to 5% of the composition based on the total weight of the composition, and further containing at least one silane-coupling agent selected from the group comprising trimethoxy[3-(oxiranylmethoxy)propyl]-silane, amino silanes, epoxy silanes, mercapto silanes, and combinations and mixtures thereof.

4. A device comprising an optoelectronic element encapsulated by the encapsulant material of claim 2.

5. An assembly comprising the device according to claim 4.

6. An encapsulant material in accordance with claim 2 wherein the soda lime glass filler is substantially free of boron.

7. A method of making an encapsulant material comprising the steps of (1) preparing an epoxy resin component comprising an average index of refraction of about 1.50-1.52 when measured over a wavelength range of 350 nm to 2500 nm; (2) uniformly mixing in a soda lime glass filler with an average index of refraction of 1.50-1.52 when measured over a wavelength range of 350 nm to 2500 nm to form a filled, curable encapsulant composition; (3) encapsulating a device with the filled, curable encapsulant composition; and (4) curing the filled encapsulant composition with time or heat to produce a cured component, wherein the cured component comprises a coefficient of thermal expansion (CTE) equal to or less than 45 ppm/° C., as measured between a temperature range between 100°-120° C., an average index of refraction of 1.50-1.52 when measured over a wavelength range of 350 nm to 2500 nm, and a regular transmission of light (RTRAN) in the range of 30% to 83% over light wavelengths from 350 nm to 2500 nm when measured in a 1.0 mm thick sample of said cured component.

8. A method according to claim 7 wherein the cured component has a glass transition temperature in the range of 120° C. to 180° C.

9. A method according to claim 7 wherein the cured component has a regular transmission of light (RTRAN) greater than 65% over light wavelengths from 350 nm to 2500 nm when measured in a 1.0 mm thick sample of said cured component.

10. A method according to claim 7 wherein the soda lime glass filler has an average index of refraction within <1% of the average index of refraction of said epoxy resin component when measured over a wavelength range of 350 nm to 2500 nm.

11. A method according to claim 7 wherein the soda lime glass filler is substantially free of boron.

12. A cured composition comprising:
an epoxy component comprising the reaction product of at least one base epoxy resin and at least one curing agent, wherein the epoxy component has an average index of refraction of 1.50 to 1.52 when measured over a wavelength range of 350 nm to 2500 nm,
and an inorganic filler material comprising a first component with the highest weight percent content of the inorganic filler material and a second component with the second highest weight percent content of the inorganic filler material, wherein the first component is silica and the second component is soda ash, and said inorganic filler being substantially free of boron;
wherein the cured composition comprises a coefficient of thermal expansion (CTE) of equal to or less than 30 ppm/° C., as measured between a temperature range between 100°–120° C., a glass transition temperature in the range of 120° C. to 180° C., and a regular transmission of light (RTRAN) in the range of 30%-83% over light wavelengths from 350 nm to 2500 nm when measured in a 1.0 mm thick sample of said cured composition.

13. A composition according to claim 12 with a regular transmission of light (RTRAN) greater than 65% over light wavelengths from 350 nm to 2500 nm when measured in a 1.0 mm thick sample of said cured composition.

14. A composition according to claim 12 wherein the inorganic filler material comprises silicon oxide, sodium oxide, and calcium oxide.

15. A composition according to claim 12 wherein the inorganic filler material is soda lime glass.

16. A composition according to claim 12 wherein the average index of refraction of the inorganic filler material is within less than 1% of the average index of refraction for the epoxy component when measured over a wavelength range of 350 nm to 2500 nm.

17. A composition according to claim 12 wherein the average index of refraction of the inorganic filler material is 1.50-1.52 when measured over a wavelength range of 350 nm to 2500 nm.

18. A composition according to claim 12 wherein the inorganic filler material comprises 50% to 70% of the cured composition based on the total weight of the cured composition.

19. The composition of claim 12 wherein the at least one base epoxy resin is elected from the group comprising triglycidyl isocyanurate and reaction products thereof, the at least one curing agent comprises an anhydride, and further comprising at least one ring opening agent for promoting the reaction of the at least one base epoxy resin and the anhydride.

20. A composition according to claim 19 wherein the base epoxy resin comprises 10% to 20% of the composition based on the total weight of the composition, the anhydride comprises 15% to 30% of the composition based on the total weight of the composition, and the polyol comprises 2% to 5% of the composition based on the total weight of the composition.

21. The composition of claim 19 wherein the ratio of the equivalents of anhydride to epoxy resin equivalents (A/E ratio) is between 0.75 and 0.95, and the ratio of the equivalents of anhydride to total equivalents of OH (A/OH ratio) is between 1.0 and 8.

22. The composition of claim 19 wherein at least one ring opening agent is a polyol selected from the group consisting of glycerol, neopentyl glycol (NPG), trimethylol propane, ethylene glycol, diethylene glycol, propylene glycol, dipropylene glycol, cyclohexane dimethanol, polyethyleneglycol and mixtures thereof.

* * * * *

UNITED STATES PATENT AND TRADEMARK OFFICE
CERTIFICATE OF CORRECTION

PATENT NO. : 10,611,911 B1
APPLICATION NO. : 15/588340
DATED : April 7, 2020
INVENTOR(S) : Burkhart et al.

It is certified that error appears in the above-identified patent and that said Letters Patent is hereby corrected as shown below:

In the Claims

Column 23, Line 35: Claim 3, Delete "the composition" and insert -- the cured compound --

Column 23, Line 36: Claim 3, Delete "the composition" and insert -- the cured compound --

Column 23, Line 37: Claim 3, Delete "the composition" and insert -- the cured compound --

Column 23, Line 38: Claim 3, Delete "the composition" and insert -- the cured compound --

Column 23, Line 39: Claim 3, Delete "the composition" and insert -- the cured compound --

Column 23, Line 40: Claim 3, Delete "the composition" and insert -- the cured compound --

Signed and Sealed this
Twenty-sixth Day of May, 2020

Andrei Iancu
*Director of the United States Patent and Trademark Office*